United States Patent
Mestha et al.

(10) Patent No.: US 8,976,859 B2
(45) Date of Patent: Mar. 10, 2015

(54) PROCESSING A VIDEO FOR SPATIAL AND TEMPORAL MAGNIFICATION WITH MINIMIZED IMAGE DEGRADATION

(71) Applicant: Xerox Corporation, Norwalk, CT (US)

(72) Inventors: Lalit Keshav Mestha, Fairport, NY (US); Survi Kyal, Rochester, NY (US); Sohail A. Dianat, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 226 days.

(21) Appl. No.: 13/708,125

(22) Filed: Dec. 7, 2012

(65) Prior Publication Data

US 2014/0160355 A1 Jun. 12, 2014

(51) Int. Cl.
- H04N 5/14 (2006.01)
- G06T 3/40 (2006.01)
- H04N 7/01 (2006.01)

(52) U.S. Cl.
CPC ............... *G06T 3/4007* (2013.01); *H04N 7/01* (2013.01)
USPC .................................................. 375/240.01

(58) Field of Classification Search
CPC ............................. H04N 19/00781; H04N 5/14
USPC .................................................... 375/240.01
See application file for complete search history.

(56) References Cited

U.S. PATENT DOCUMENTS

| | | | | |
|---|---|---|---|---|
| 2002/0150164 A1* | 10/2002 | Felts et al. | | 375/240.19 |
| 2004/0114689 A1* | 6/2004 | Zhang et al. | | 375/240.16 |
| 2006/0222079 A1* | 10/2006 | Park et al. | | 375/240.16 |
| 2010/0135395 A1* | 6/2010 | Servais et al. | | 375/240.16 |
| 2013/0010871 A1* | 1/2013 | Kwon | | 375/240.16 |

OTHER PUBLICATIONS

Donoho, David, "Compressed Sensing", IEEE Trans. Inf. Theory, vol. 52, No. 4, Apr. 2006, pp. 1289-1306.
Park et al., "Super-Resolution Image Reconstruction: A Technical Overview", IEEE Signal Processing Magazine, May 2003, pp. 21-36.
Sun et al., "Image Hallucination with Primal Sketch Priors", IEEE 2003.
Sun et al., "Image Super-Resolution Using Gradient Profile Prior".
Yang et al., "Image Super-Resolution Via Sparse Representation", IEEE Transactions on Image Processing, vol. 19, No. 11, Nov. 2010, pp. 2861-2873.

* cited by examiner

*Primary Examiner* — Jay Au Patel
*Assistant Examiner* — Yulin Sun
(74) *Attorney, Agent, or Firm* — Philip E. Blair; Fleit Gibbons Gutman Bongini & Bianco P.L.

(57) ABSTRACT

What is disclosed is a novel video processing system and method wherein a plurality of image frames of a video captured using a video camera with a spatial resolution of (M×N) in the (x, y) direction, respectively, and a temporal resolution (T) in frames per unit of time. A first and second magnification factor $f_1$, $f_2$ are selected for spatial enhancement in the (x, y) direction. A third magnification factor $f_3$ is selected for a desired temporal enhancement in (T). The video data is processed using a dictionary comprising high and low resolution patch cubes which are used to induce spatial and temporal components in the video where no data exists. A high resolution course video $X_0$ is generated which has an enhanced spatial resolution of $(f_1*M)×(f_2*N)$ and an enhanced temporal resolution of $(f_3*T)$ frames. The course high resolution video is then smoothed, when found required, to generate a smoothed high resolution video.

15 Claims, 7 Drawing Sheets

PROCESSING A VIDEO FOR SPATIAL AND TEMPORAL MAGNIFICATION WITH MINIMIZED IMAGE DEGRADATION

TECHNICAL FIELD

The present invention is directed to systems and methods for processing a video captured using a low resolution, low speed video camera to generate a high resolution, high speed video as output.

BACKGROUND

Image enhancement is a method where a high resolution image is constructed from a low resolution image to produce an image which has been magnified to some degree. Prior art methods involve using an interpolation technique to fill in areas of the image where no data exists. However, the quality of the magnified image is inherently limited because, as the magnification factor increases, image detail degrades as larger areas of missing data in the image need to be generated. For video, the problem requires not only magnifying each frame of the video in the x, y direction, but also magnifying the video to increase the frame rate of the video sequence such that the video is enhanced both spatially and temporally.

Accordingly, what is needed in this art is a sophisticated video processing system and method which receives a lower resolution, lower frame rate video and processes that video to generate a higher resolution, higher frame rate video as output while minimizing image degradation.

BRIEF SUMMARY

What is disclosed is a video processing system and method which receives a lower resolution, lower frame rate video and processes that video to generate a higher resolution, higher frame rate video with minimized image degradation. The present method reconstructs missing image data in the x, y and t direction using a compressed sensing framework. The teachings hereof enable video magnification in all three directions in real-time as the video is being captured. The present techniques find their uses in a wide array of diverse applications such as medical imaging, satellite imaging, military and homeland security applications, to name a few.

In one embodiment, the present method for increasing the temporal and spatial resolution of a video involves the following. First, a plurality of image frames of a video are received for processing. The video has been captured using a video camera with a spatial resolution of (M×N) in the (x, y) direction, respectively, and a temporal resolution (T) in frames per unit of time. First and second magnification factor $f_1$, $f_2$ are selected for a desired amount of spatial enhancement in (x, y). A third magnification factor $f_3$ is also selected for a desired amount of temporal enhancement in T. The received image frames are processed using a dictionary comprising a set of high and low resolution patch cubes. In a manner more fully disclosed herein, the patch cubes of video data are used to induce spatial and temporal components in the video where no data exists. A high resolution course video $X_0$ is generated as a result of processing the received video. The high resolution course video has a spatial resolution of $(f_1*M) \times (f_2*N)$ and a temporal resolution of $(f_3*T)$. The course video can be smoothed to produce a smoothed video for subsequent viewing and analysis.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a video processing system and method which receives a lower resolution, lower frame rate video and processes that video to generate a higher resolution, higher frame rate video with minimized image degradation.

Non-Limiting Definitions

"Spatial resolution" refers to the number of pixels in a given image frame of a video in the (x, y) direction. Spatial resolution is typically in pixels per image (ppi). A camera with a higher spatial resolution means the camera can capture a higher density of pixels per image.

"Temporal resolution", also called "frame rate", refers to the number of images a video camera is capable of capturing in a pre-defined amount of time. Temporal resolution T is in frames per unit of time, typically frames per second (fps). A video camera with a higher temporal resolution means that the camera can acquire more images over a given amount of time, i.e., at a higher frame rate.

A "spatial magnification factor" is a multiplier that is used herein to define an amount of video enhancement (in one or both of the x, y directions). In various embodiments hereof, a first and second spatial magnification factor $f_1$, $f_2$, where ($f_1 \geq 1$) and ($f_2 \geq 1$), are selected or otherwise received for a desired resolution enhancement in the (x, y) direction, respectively. For example, given a selected spatial magnification factor of $f_1=f_2=3$, a received video that was captured by a video camera with a spatial resolution of 320×320 pixels per image would have a post-processed spatial resolution of (3*320)×(3*320), i.e., 960×960 pixels per image.

Figure 1:
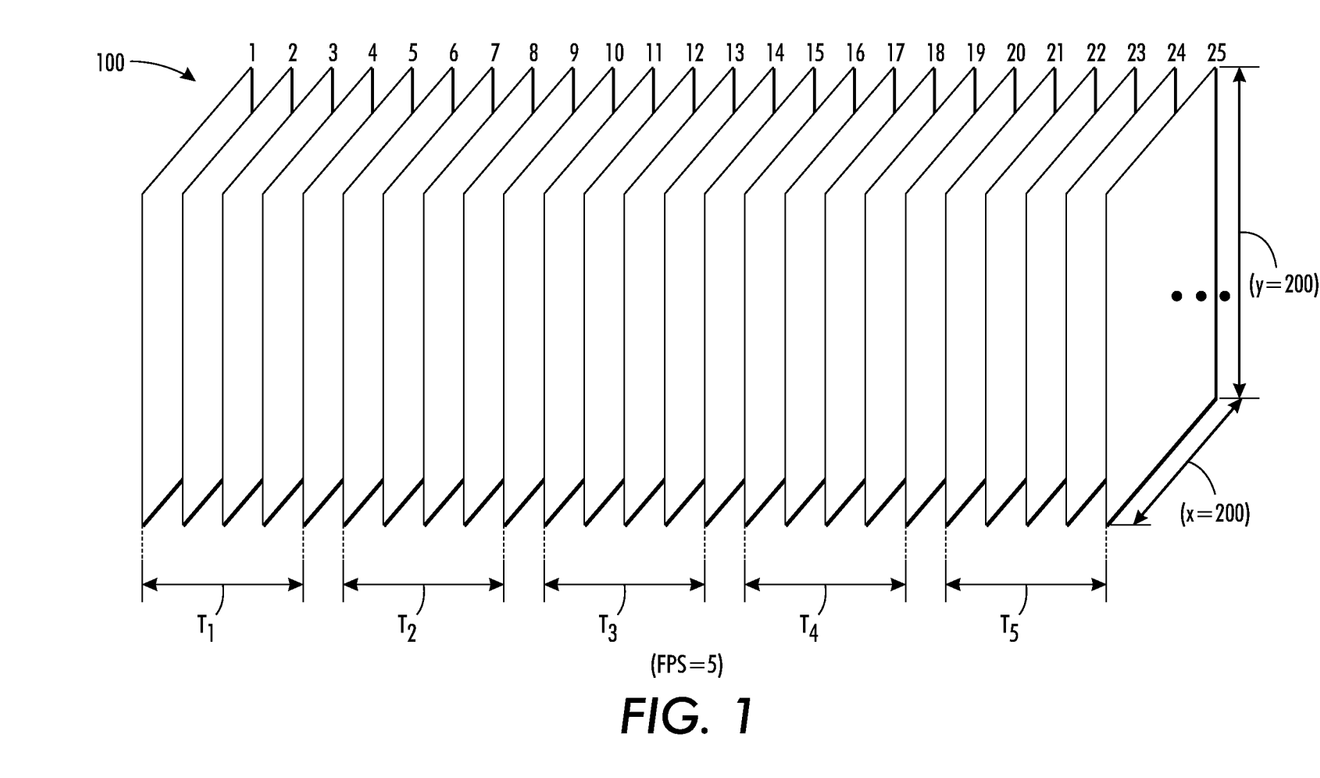
FIG. 1 shows an example section of a pre-processed video that has been captured using a video camera with a spatial resolution of (200×200) pixels at a temporal resolution of 5 fps.

A "temporal magnification factor" is a multiplier that is used herein to define an amount of video enhancement in the number of frames per second (T-direction). In various embodiments hereof, a temporal magnification factor $f_3$, where $f_3 \leq 2$, is selected or otherwise received for a desired temporal resolution enhancement in the T-direction. For example, given a selected temporal magnification factor of $f_3=5$, a received video that was captured by a video camera with a frame rate of 20 fps would have a post-processing temporal resolution of (5*20), i.e., 100 fps. FIG. 1 shows an example 25 frame section 100 of an example video captured by a video camera with a spatial resolution of (200×200) pixels per image at a frame rate of 5 fps.

"Selecting", as used herein, is intended to be widely construed. Selecting a magnification factor means to choose, provide, enter, receive or otherwise obtain information which identifies a desired amount of video enhancement for the purposes hereof. Selections can be made by a user using, for instance, a keyboard of a computer workstation or using a mouse. Making a selection may involve using pull down menus and selecting one or more menu options as is normally understood, using for example a mouse-click operation or making an entry using a keyboard or keypad. Such a selection may be pre-set or otherwise defined. Selectable menu options, values, parameters, and the like, may be retrieved from a memory or storage and provided to a processor executing machine-readable program instructions to effectuate such selections. One or more selections may be obtained from an application or from a remote device over a network.

A "video", as is generally understood, refers to a time-varying sequence of 2D images which have been captured using a video camera at a given frame rate. The video is received for processing.

"Receiving a video" is intended to be widely construed and means to retrieve, receive, capture with a video camera, or otherwise obtain a video for processing in accordance with the present method. The video can be retrieved from a memory or internal storage of the video camera system, or obtained from a remote device over a network. The video may also be retrieved from a media such as a CDROM, DVD, or USB drive, for example. The video may be downloaded from a website for processing. The video can be captured and processed using a handheld cellular device or a handheld computing device such as an iPad. The received video is processed using a dictionary.

A "dictionary" contains a set of high resolution patch cubes $P_h$. In another embodiment, the dictionary further contains a set of low resolution patch cubes $D_l$. The low and high resolution patch cubes of video data are used to induce spatial and temporal components in the received video where no data exits to obtain a resulting enhanced video having the user-desired spatial and temporal magnification. It should be understood that the video data comprising any given patch cube can be written as a vector. As such, terms such as "patch cube" and "vector" are used interchangeably. The low and high resolution patch cubes comprising various embodiments of the dictionary are obtained from having processed low and high resolution training videos.

A "low resolution training video" is a video captured using a video camera with a resolution of (M×N×T) such that the low resolution training video has the same spatial and temporal resolution as the received video desired to be processed.

Figure 2:
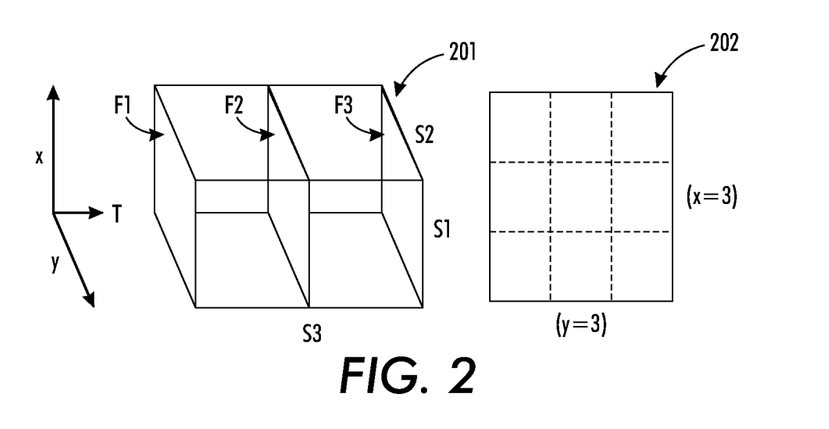
FIG. 2 shows an example 3D box of size 3×3×3 used to define low resolution patch cubes of video data for the dictionary.
Figure 3:
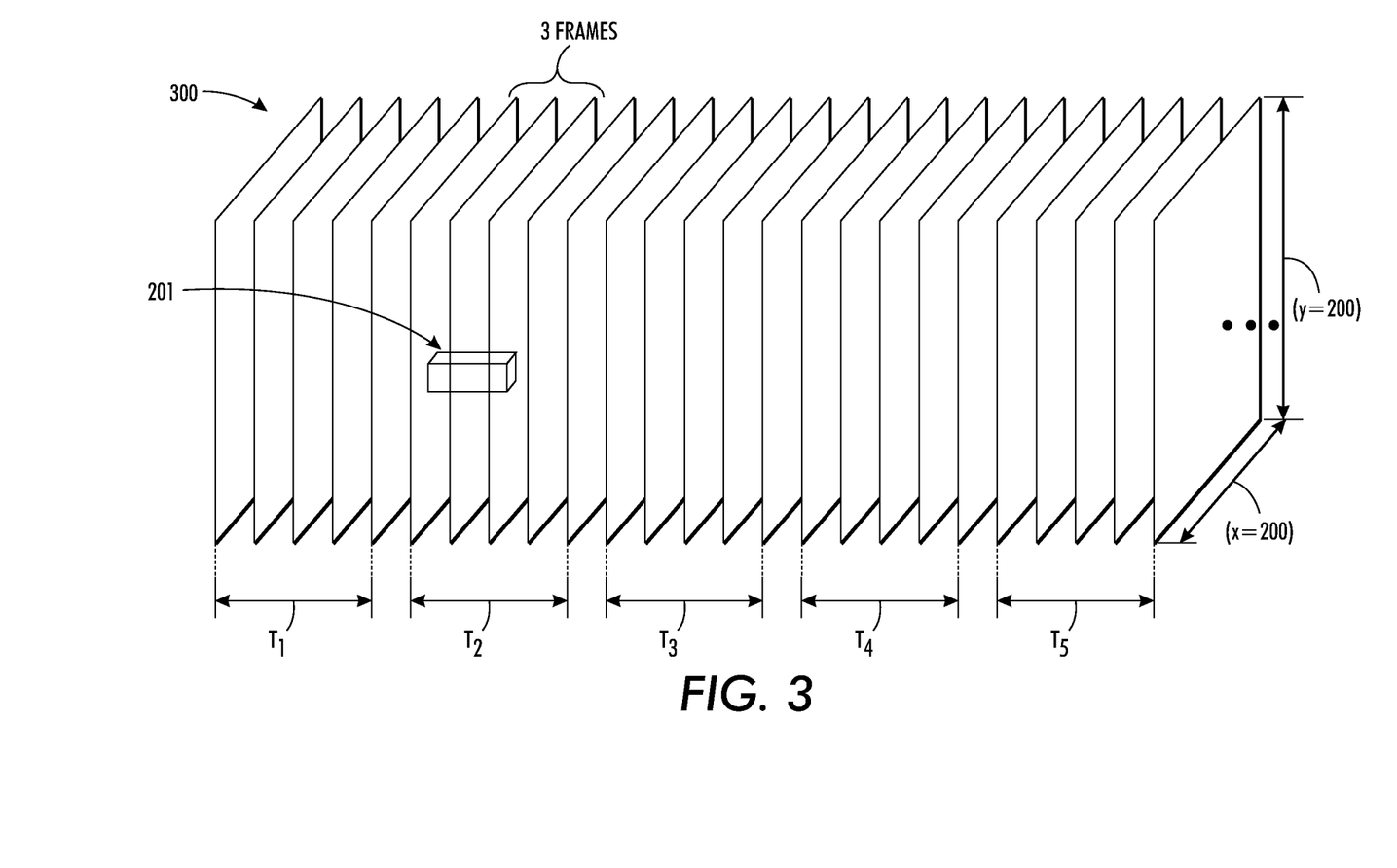
FIG. 3 shows the example 3D box of FIG. 2 having been placed in a random location in a section of a low resolution training video having a same spatial and temporal resolution as the pre-processed video of FIG. 1 with each location of the 3D box defining a 3×3×3 low resolution patch cube of video data.

Assume for discussion purposes that a portion of a pre-processed video (of FIG. 1) is received which has a spatial resolution of 200×200 pixels per image, and a temporal resolution of 5 fps. In one embodiment, the set of low resolution patch cubes $D_l$ is obtained by randomly moving a 3D box of size (S1×S2×S3), where (S1,S2,S3)≥3, throughout the various image frames of video data of one or more low resolution training videos to repeatedly carve out 3D cross-sections of low resolution video data. Each 3D cross-section of video data, as the 3D box is re-positioned at various random locations throughout a low resolution training video, defines a respective low resolution patch cube for the dictionary. FIG. 2 illustrates an example 3D box 201 with a size of at least (3×3×3). Each location of the 3D box in the low resolution training video defines a cross-section of (F1,F2,F3) frames of low resolution data. In this example, a single image frame of video data (at 202) comprises a (3×3) array of pixels. FIG. 3 shows the 3D box 201 at a random location in an example low resolution training video 300 which has the same spatial and temporal resolution as the received video of FIG. 1. The 3D box 201 is used to repeatedly define a 3 frame cross-section of low resolution patch cube data. It should be appreciated that FIG. 3 is illustrative and that the size of the (3×3×3) 3D box relative to the x=200,y=200 dimensions of the low resolution training video is not to scale. In other embodiments, a set of low resolution patch cubes can be obtained from having down-sampled a set of high resolution patch cubes. If $X_h$ is a high resolution patch cube of video data then a corresponding low resolution patch cube $X_l$ of video data can be defined by:

$$X_l = SX_h \quad (1)$$

where S is a down-sampling operator.

Figure 4:
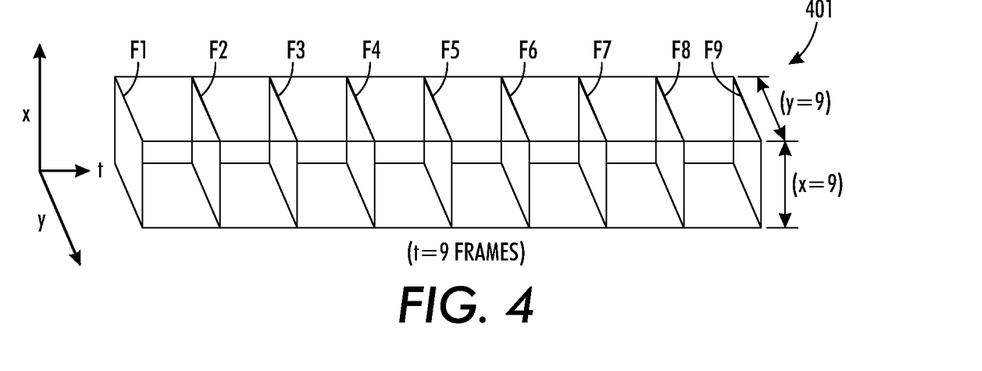
FIG. 4 shows the 3×3×3 box of FIG. 2 having been expanded by a magnification factor of 3× to define a 3D box of size (9×9×9) used to define high resolution patch cubes of video data for the dictionary.
Figure 5:
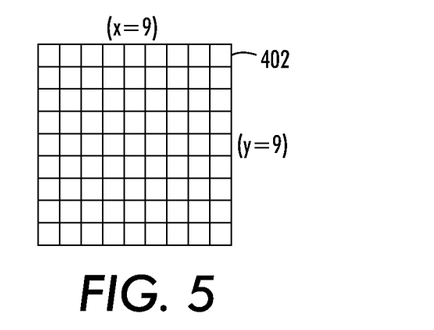
FIG. 5 shows a single image frame of a high resolution patch cube of video data comprising a two dimensional array (9×9) of pixels.
Figure 6:
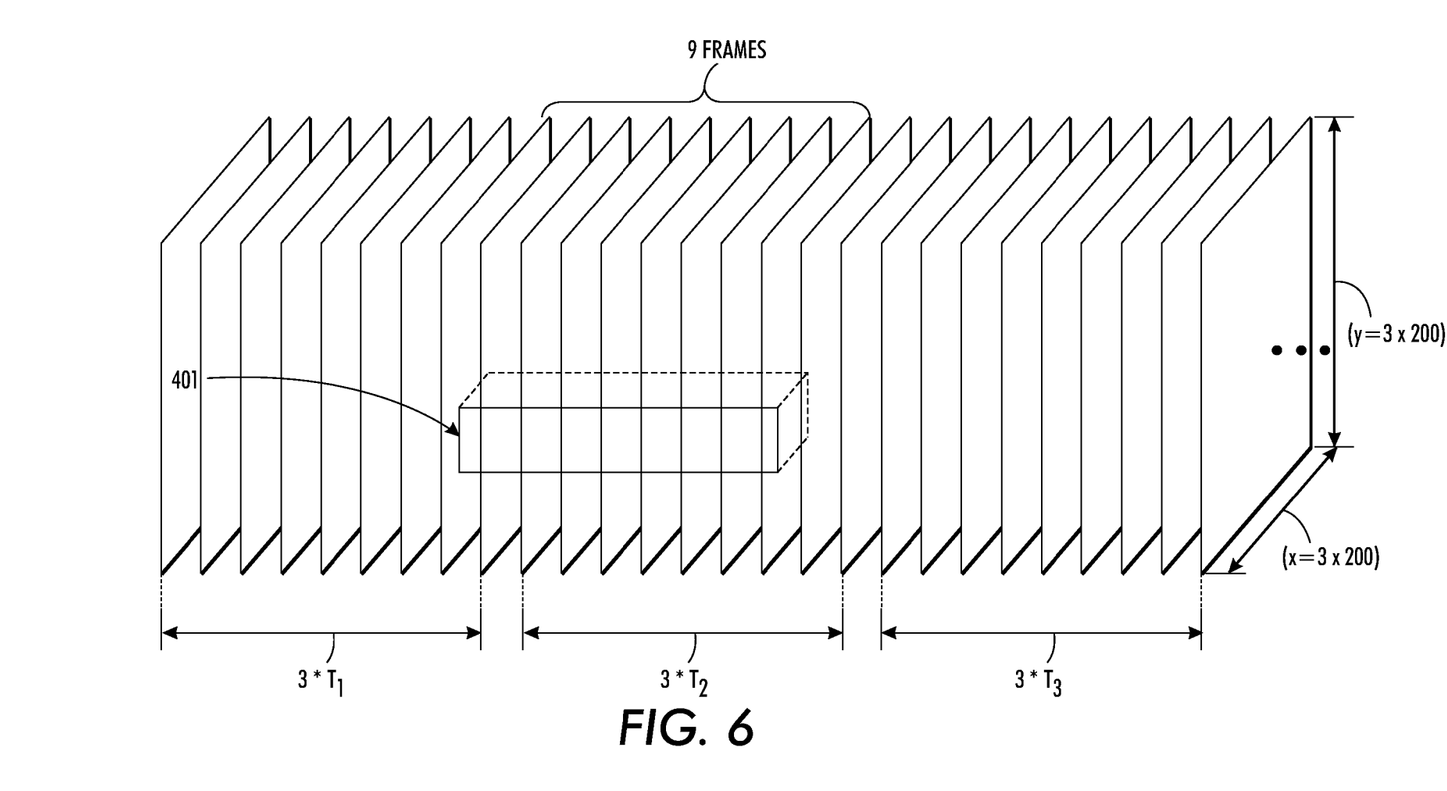
FIG. 6 shows the 9×9×9 3D box of FIG. 4 placed at a random location in a section of a high resolution training video which has a same spatial and temporal resolution as the post-processed video of FIG. 1 with each location of this 3D box defining a (9×9×9) high resolution patch cube of video data.

A "high resolution training video" is a video captured using a video camera with a resolution of $(f_1*M) \times (f_2*N) \times (f_3*T)$ such that the high resolution training video has the same spatial and temporal resolution as post-processed received video. In one embodiment, the set of high resolution patch cubes is obtained from a high resolution training video. In a similar manner as discussed with respect to obtaining the low resolution patch cubes $D_l$, the set of high resolution patch cubes $P_h$ are obtained by randomly moving a spatially and temporally magnified 3D box of size $(f_1*S1) \times (f_2*S2) \times (f_3*S3)$ through the image frames of one or more high resolution training videos. Each location of the 3D box as it is re-positioned through the high resolution training video data defines a respective high resolution patch cube for the dictionary. Assume, for discussion purposes, that the video of FIG. 1 is received for processing and that the user has selected a 3× magnification factor such that: $f_1=f_2=f_3=3$. FIG. 4 shows the 3D box 201 (of FIG. 2) of size (3×3×3) having been expanded, for the purpose of defining high resolution patch cubes for the dictionary, by a factor of 3 to define a 3D box 401 of size (9×9×9). Each location of 3D box 401 in the high resolution training video defines a cross-section of 9 frames (at F1-F9) of high resolution video data. FIG. 5 shows a single frame of patch cube data comprising a two dimensional array (9×9) of pixels. FIG. 6 shows the 3D box 401 placed at a random location in the high resolution training video 600 to define a high resolution patch cube comprising 9 frames of high resolution video data. It should be appreciated that FIG. 6 is illustrative and that the size of the 3D box relative to the x=600,y=600 dimensions of the high resolution training video is not to scale. Alternatively, the high resolution patch cubes are obtained by up-sampling the set of low resolution patch cubes obtained from a low resolution training video.

"Processing the video" means using the dictionary to spatially and temporally enhance the received video to obtain an output video having the desired magnification.

Video Processing

A cross-section of received video data is repeatedly identified using a 3D box of size at least (3×3×3), starting from the first pixel of image data. Each cross-section of video data is processed by identifying a high resolution patch cube of data in the dictionary to magnify (patch) this particular 3D piece of video data. The identified cross-section of low resolution video data is patched as follows. If the first magnification factor $f_1 \neq 1$, the identified high resolution patch cube is used to increase a size of the identified cross-section of video data by $f_1$ pixels in the x-direction. If the selected second magnification factor $f_2 \neq 1$, the identified high resolution patch cube is used to increase a size of the identified cross-section by $f_2$ pixels in the y-direction. And, the identified high resolution patch cube is used to increase a number of frames of the cross-section of video data by $f_3$ frames in the T-direction. Thereafter, the 3D box is shifted to identify a next cross-section of video data for processing with the following constraints. (1) If the first magnification factor $f_1 \neq 1$, then the 3D box is shifted such that the next cross-section of video data overlaps the previous cross-section of video data by at least $f_1$ pixels in the x-direction. (2) If the second magnification factor $f_2 \neq 1$, then the 3D box is shifted such that the next cross-section of video data also overlaps the previous cross-section of video data by at least $f_2$ pixels in the y-direction. (3) The 3D box is shifted such that the next cross-section of video data also overlaps the previous cross-section of video data by at least 1 frame in the T direction. Once the next cross-section of video data has been identified, this data is processed. The 3D box is again shifted with the constraints having been met and that cross-section of video data is processed. The process repeats until all video data has been processed.

A low resolution vector y can be considered a sparse linear combination of low-resolution patch cubes $D_l$. This relationship is given by:

$$y = \alpha * D_l \quad (2)$$

$$\alpha^* = \arg\min \lambda \|\alpha\|_1 + \|\hat{D}\alpha - \hat{y}\|_2 \quad (3)$$

where $\hat{D} = [f_l D_l \; PH_h]^T$, ($F_l D_l$ and $PD_h$ are matrices of low and high resolution patch cubes, respectively), T is a matrix transpose operation, $F_l$ is a linear feature extraction operator, P is a matrix operator for the region of overlap occurring between a target patch cube and a previously reconstructed patch cube, and $\hat{y}$ is the concatenated vector of y and w where w contains the value of the reconstructed high resolution patch cube on the overlap. We use $\alpha^*$ and the set of high resolution patch cubes $P_h$ to repeatedly accumulate high-resolution vectors x using $x = \alpha * D_h$ to obtain course video $X_0$.

Using the steepest decent, we find the closest image to $X_0$ which satisfies the constraint:

$$X^* = \arg\min_x \|Y - SHX\|_2^2 + c\|X - X_0\|_2^2 \quad (4)$$

where Y is the received video, H is a blurring filter, and S is a down-sampling operator.

The course video is smoothed by:

$$X(k+1) = X(k) - \upsilon H^T S^T [SHX(k) - Y] - \upsilon c[X(k) - X_0] \quad (5)$$

where X(k) is the optimal solution at the $k^{th}$ iteration, $\upsilon$ is an adaptation constant, Y is the received low resolution image, $X_0$ is the course high resolution image, and c is a weighting factor.

Flow Diagram of One Example Embodiment

Figure 7:
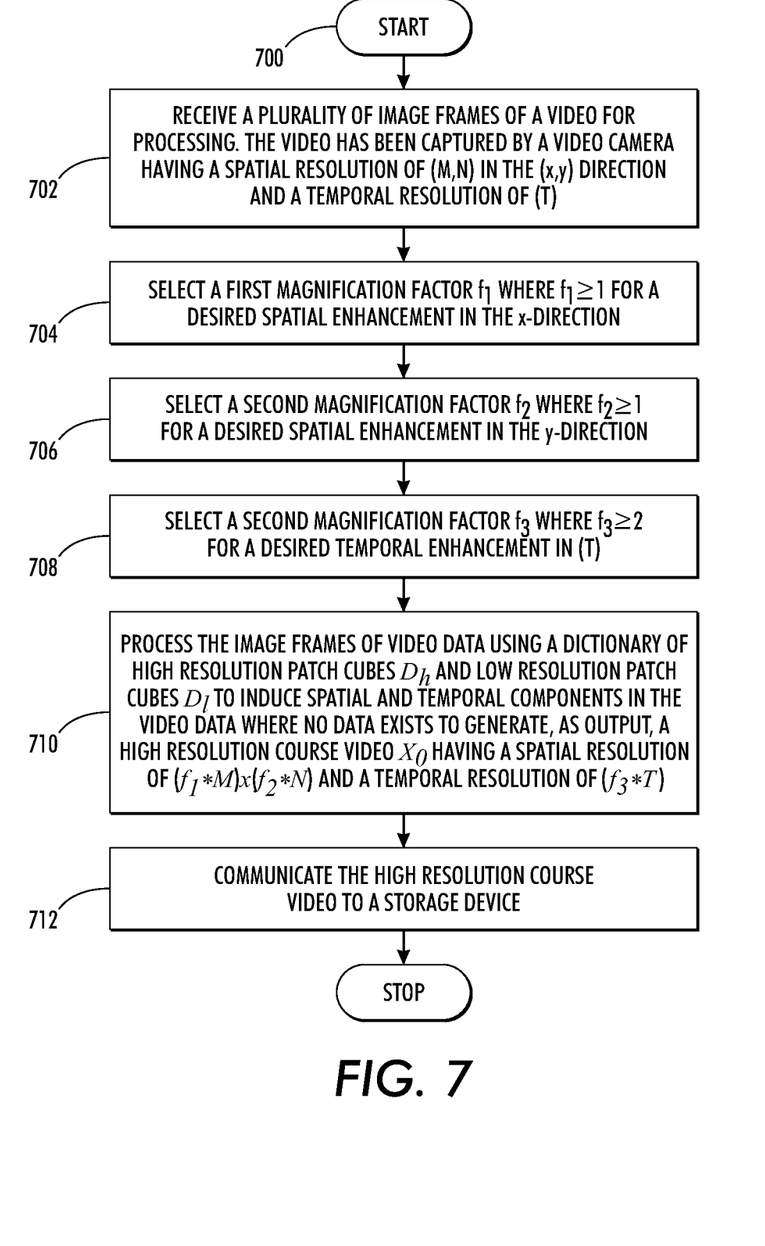
FIG. 7 is a flow diagram which illustrates one example embodiment of the present method for increasing a resolution of a video.

Reference is now being made to the flow diagram of FIG. 7 which illustrates one example embodiment of the present method for increasing a resolution of a video. Flow processing begins at step 700 and immediately proceeds to step 702.

At step 702, receive a plurality of image frames of video data for processing. The video data has been captured using a video camera having a resolution of (M×N×T), where (M×N) is a spatial resolution of the camera in (x, y), respectively, and T is a temporal resolution of the camera in frames per unit of time.

At step 704, select a first magnification factor $f_1$ where $f_1 \geq 1$ for a desired spatial enhancement in the x-direction.

At step 706, select a second magnification factor $f_2$ where $f_2 \geq 1$ for a desired spatial enhancement in the y-direction.

At step 708, select a third magnification factor $f_3$, where $f_3 \geq 2$, for a desired temporal enhancement in T.

At step 710, process the image frames of video data using a dictionary of high resolution patch cubes $P_h$ and low resolution patch cubes $D_l$ to induce spatial and temporal components in the video data where no data exists. The processing generates, as output, a high resolution course video $X_0$ having a spatial resolution of $(f_1*M) \times (f_2*N)$ and a temporal resolution of $(f_3*T)$.

At step 712, communicate the high resolution course video to a storage device. The high resolution course video can be communicated to a memory or a graphical display device for viewing. The generated course video can be communicated to a workstation for further processing. In this embodiment, further processing stops. In other embodiments, the high resolution course video is smoothed to generate a smoothed high resolution video.

It should be appreciated that the flow diagrams hereof are illustrative. One or more of the operative steps illustrated in any of the flow diagrams may be performed in a differing order. Other operations, for example, may be added, modified, enhanced, condensed, integrated, or consolidated with the steps thereof. Such variations are intended to fall within the scope of the appended claims. All or portions of the flow diagrams may be implemented partially or fully in hardware in conjunction with machine executable instructions.

Example Functional Block Diagram

Figure 8:
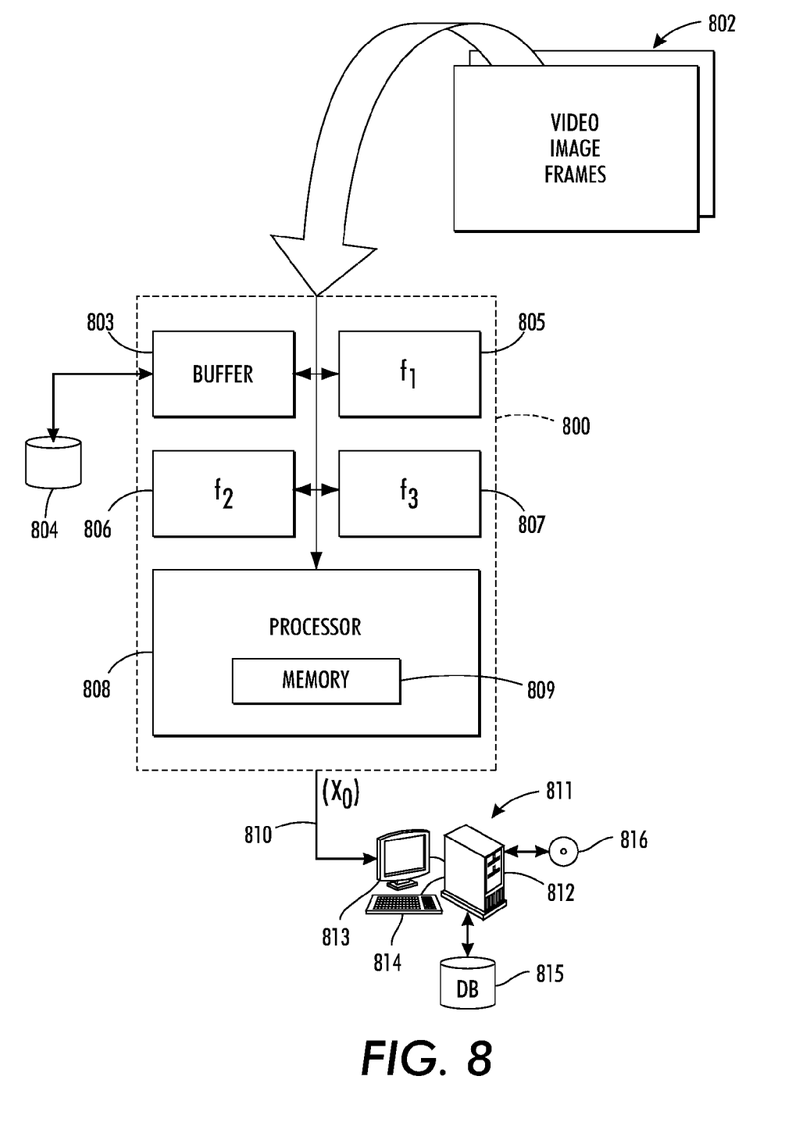
FIG. 8 illustrates a block diagram of one example video processing system for implementing various aspects of the present method described with respect to the flow diagram of FIG. 7.

Reference is now being made to FIG. 8 which illustrates a block diagram of one example video processing system 800 for implementing various aspects of the present method described with respect to the flow diagram of FIG. 7.

In FIG. 8, video processing system 800 receives video image frames 202 into buffer 803. Buffer 803 may be used for queuing the received video data and may further include, for instance, one or more target frames of video data within the video that have been identified or otherwise selected for processing. The buffer may be configured to also store data, mathematical formulas and other representations to facilitate processing of the image in accordance with the teachings hereof. Such data can be stored to storage media 804. First, Second, and Third Magnification Factor Selection Modules, at 805, 806 and 807, respectively, effectuate a user selection of a desired magnifications in the (x, y)-direction and in (T). Processing Module 808 which contains a memory 809, receives the buffered image data and desired magnification factors and processes the received video data, in accordance with the teachings hereof, to produce a course high resolution video $X_0$ (at 810) which is communicated to workstation 811 for further processing such as smoothing. Workstation 811 is shown comprising a computer case 812 housing a motherboard, CPU, memory, interface, storage device, and a communications link such as a network card. The computer workstation is also shown having a display device 813 such as a CRT, LCD, or touchscreen display. An alphanumeric keyboard 814 and a mouse (not shown) effectuate a user selection of the various magnification factors. It should be appreciated that the workstation has an operating system and other specialized software configured to display a variety of numeric values, text, scroll bars, pull-down menus with user selectable options, and the like, for entering, selecting, or modifying information presented on the display device. In the embodiment of FIG. 8, computer system 811 implements a database 815 comprising a plurality of records. Although the database is shown as an external device, the database may be internal to computer case 812 mounted on a hard disk housed therein. A record refers to any data structure capable of containing information which can be indexed, stored, searched, and retrieved in response to a query. Any of the results of system 800 may also be stored and/or retrieved to any of the records in database 815. Such data and may further be communicated to remote devices over a network (not shown). The workstation of FIG. 8 further comprises a storage media 816 for storing or retrieving results including for transporting various aspects of the dictionary, as defined herein.

Any of the modules and processing units of FIG. 8 are in communication with workstation 811 via pathways (not shown) and may further be in communication with one or more remote devices over a network. It should be appreciated that some or all of the functionality for any of the modules of system 800 may be performed, in whole or in part, by components internal to the workstation or by a special purpose computer system. It should also be appreciated that various modules may designate one or more components which may, in turn, comprise software and/or hardware designed to perform the intended function. A plurality of modules may collectively perform a single function. Each module may have a specialized processor and memory capable of retrieving and executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked over a network.

Various Embodiments

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of an operating system, a plug-in, or may be shipped, sold, leased, or otherwise provided separately either alone or as part of an add-on, update, upgrade, or product suite. It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for increasing a resolution of a video, the method comprising:
   receiving a plurality of image frames of video data for processing, said video data having been captured using a video camera having a resolution of (M×N×T), where (M×N) is a spatial resolution of said camera in (x, y), respectively, and T is a temporal resolution of said camera in frames per unit of time;
   selecting a first and second magnification factor $f_1$, $f_2$, where $(f_1, f_2) \geq 1$, for a desired spatial enhancement in (x, y), respectively;
   selecting a third magnification factor $f_3$, where $f_3 \geq 2$, for a desired temporal enhancement in T; and
   processing said image frames of video data using a dictionary of high and low resolution patch cubes $D_h$ and $D_l$, respectively, to induce spatial and temporal components in said video data where no data exists, said processing generating a high resolution course video $X_0$ with a spatial resolution of $(f_1*M) \times (f_2*N)$ and a temporal resolution of $(f_3*T)$.

2. The method of claim 1, wherein said set of high resolution patch cubes are obtained from one of:
   a low resolution training video captured using a video camera with a resolution of (M×N×T), said low resolution training video being used to obtain a set of low resolution patch cubes $D_l$, said low resolution patch cubes being up-sampled by a factor of $(f_1 \times f_2 \times f_3)$ to obtain said set of high resolution patch cubes $D_h$; and a high resolution training video captured using a video camera with a resolution of $(f_1*M) \times (f_2*N) \times (f_3*T)$.

3. The method of claim 1, wherein said processing comprises:
   (A) identifying a cross-section of video data using a 3D box with a size of at least 3×3×3;
   (B) identifying a high resolution patch cube in said dictionary;
   (C) using said identified high resolution patch cube to process said cross-section of video data, said processing comprising:
      in response to $f_1 \neq 1$, using said identified high resolution patch cube to increase a size of said cross-section by $f_1$ pixels in the x-direction;
      in response to $f_2 \neq 1$, using said identified high resolution patch cube to increase a size of said cross-section by $f_2$ pixels in the y-direction; and
      using said identified high resolution patch cube to increase a number of frames of said cross-section of video data by $f_3$ frames;
   (D) shifting said 3D box to identify a next cross-section of video data; and
   repeating steps (A)-(D) until all desired image frames have been processed.

4. The method of claim 3, wherein in response to $f_1 \neq 1$ a next cross-section of video data overlaps a previous cross-section of video data by at least $f_1$ pixels in the x direction, wherein in response to $f_2 \neq 1$, a next cross-section of video data overlaps a previous cross-section of video data by at least $f_2$ pixels in the y direction; and wherein a next cross-section of video data overlaps a previous cross-section of video data by at least 1 frame in the T direction.

5. The method of claim 1, further comprising smoothing said high resolution course video to generate a smoothed high resolution video.

6. The method of claim 1, wherein said high resolution patch cubes have a size of $(3*f_1) \times (3*f_2) \times (3*f_3)$.

7. The method of claim 1, wherein said first, second and third magnification factors are all the same.

8. The method of claim 1, further comprising communicating said high resolution course video to any of: a memory, storage device, and a graphical display device for viewing.

9. A system for increasing a resolution of a video, the system comprising:
   a memory and a storage device; and
   a processor in communication with said memory, said processor executing machine readable instructions for performing:
      receiving a plurality of image frames of video data for processing, said video data having been captured using a video camera having a resolution of (M×N×T), where (M×N) is a spatial resolution of said camera in (x, y), respectively, and T is a temporal resolution of said camera in frames per unit of time;
      selecting a first and second magnification factor $f_1$, $f_2$, where $(f_1, f_2) \geq 1$, for a desired spatial enhancement in (x, y), respectively;
      selecting a third magnification factor $f_3$, where $f_3 \geq 2$, for a desired temporal enhancement in T; and
      processing said image frames of video data using a dictionary of high and low resolution patch cubes $D_h$ and $D_l$, respectively, to induce spatial and temporal components in said video data where no data exists, said processing generating a high resolution course video $X_0$ with a spatial resolution of $(f_1*M) \times (f_2*N)$ and a temporal resolution of $(f_3*T)$; and
      communicating said high resolution course video to said storage device.

10. The system of claim 9, wherein said set of high resolution patch cubes are obtained from one of:
    a low resolution training video captured using a video camera with a resolution of (M×N×T), said low resolution training video being used to obtain a set of low resolution patch cubes $D_l$, said low resolution patch cubes being up-sampled by a factor of $(f_1 \times f_2 \times f_3)$ to obtain said set of high resolution patch cubes $P_h$; and
    a high resolution training video captured using a video camera with a resolution of $(f_1*M) \times (f_2*N) \times (f_3*T)$.

11. The system of claim 9, wherein said processing comprises:
    (A) identifying a cross-section of video data using a 3D box with a size of at least 3×3×3;
    (B) identifying a high resolution patch cube in said dictionary;
    (C) using said identified high resolution patch cube to process said cross-section of video data, said processing comprising:
       in response to $f_1 \neq 1$, using said identified high resolution patch cube to increase a size of said cross-section by $f_1$ pixels in the x-direction;
       in response to $f_2 \neq 1$, using said identified high resolution patch cube to increase a size of said cross-section by $f_2$ pixels in the y-direction; and
       using said identified high resolution patch cube to increase a number of frames of said cross-section of video data by $f_3$ frames;
    (D) shifting said 3D box to identify a next cross-section of video data; and
    repeating steps (A)-(D) until all desired image frames have been processed.

12. The system of claim 11, wherein in response to $f_1 \neq 1$ a next cross-section of video data overlaps a previous cross-section of video data by at least $f_1$ pixels in the x direction, wherein in response to $f_2 \neq 1$, a next cross-section of video data overlaps a previous cross-section of video data by at least $f_2$ pixels in the y direction; and wherein a next cross-section of video data overlaps a previous cross-section of video data by at least 1 frame in the T direction.

13. The system of claim 9, further comprising smoothing said high resolution course video to generate a smoothed high resolution video.

14. The system of claim 9, wherein said high resolution patch cubes have a size of $(3*f_1) \times (3*f_2) \times (3*f_3)$.

15. The system of claim 9, wherein said first, second and third magnification factors are all the same.

* * * * *